United States Patent
Han

(10) Patent No.: US 9,807,300 B2
(45) Date of Patent: Oct. 31, 2017

(54) DISPLAY APPARATUS FOR GENERATING A BACKGROUND IMAGE AND CONTROL METHOD THEREOF

(71) Applicant: SAMSUNG ELECTRONICS CO., LTD., Suwon-si, Gyeonggi-do (KR)

(72) Inventor: Jeong-ho Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/929,837

(22) Filed: Nov. 2, 2015

(65) Prior Publication Data

US 2016/0155009 A1 Jun. 2, 2016

(30) Foreign Application Priority Data

Nov. 14, 2014 (KR) .......................... 10-2014-0159026

(51) Int. Cl.
*G06K 9/00* (2006.01)
*H04N 5/222* (2006.01)
(Continued)

(52) U.S. Cl.
CPC ........... *H04N 5/23222* (2013.01); *G06T 5/00* (2013.01); *H04N 5/23293* (2013.01);
(Continued)

(58) Field of Classification Search
CPC ............... G06K 9/00255; G06K 9/342; H04N 5/23222; H04N 5/23293; H04N 5/2621; H04N 5/272; H04N 5/2222; G06T 5/00
See application file for complete search history.

(56) References Cited

U.S. PATENT DOCUMENTS 5,914,748 A * 6/1999 Parulski ................. H04N 5/272
348/239
8,136,167 B1 * 3/2012 Gossweiler, III .. H04N 1/00347
382/289
(Continued)

FOREIGN PATENT DOCUMENTS

KR 10-2011-0111662 10/2011
KR 10-1241625 3/2013

OTHER PUBLICATIONS

Varadarajan et al. ("Background subtraction using spatio-temporal continuities," 2010 2nd European Workshop on Visual Information Processing (EUVIP), pp. 144-148.*

*Primary Examiner* — Yubin Hung
(74) *Attorney, Agent, or Firm* — Staas & Halsey LLP

(57) ABSTRACT

A display apparatus is provided. The display apparatus includes a storage unit configured to, in response to a subject being captured, store a captured first image, an output unit configured to, in response to the first image being stored, output a guide message for guiding a subject so as to move out of a subject area of the first image, and a controller configured to, in response to the subject being moved and re-capturing being performed, acquire a re-captured second image, detect a local image area corresponding to the subject area of the first image from the second image, synthesize the detected local image area with the first image, generate a background image from which the subject is removed, and store the background image in the storage unit.

20 Claims, 12 Drawing Sheets

(51) Int. Cl.
*H04N 5/232* (2006.01)
*H04N 5/262* (2006.01)
*H04N 5/272* (2006.01)
*G06T 5/00* (2006.01)

(52) U.S. Cl.
CPC ........... *H04N 5/2621* (2013.01); *H04N 5/272* (2013.01); *G06K 9/00255* (2013.01); *H04N 5/2222* (2013.01)

(56) References Cited

U.S. PATENT DOCUMENTS

| | | | | |
|---|---|---|---|---|
| 2001/0055414 | A1* | 12/2001 | Thieme | G06T 11/60 382/135 |
| 2006/0120592 | A1* | 6/2006 | Park | G06T 11/60 382/154 |
| 2006/0158544 | A1* | 7/2006 | Nakajima | H04N 1/2112 348/333.01 |
| 2007/0230794 | A1* | 10/2007 | McAlpine | G06T 11/60 382/190 |
| 2008/0037874 | A1* | 2/2008 | Chang | G06T 7/0004 382/195 |
| 2008/0137957 | A1* | 6/2008 | Xu | G06K 9/00261 382/190 |
| 2008/0226123 | A1* | 9/2008 | Birtwistle | G06T 11/001 382/100 |
| 2009/0257622 | A1* | 10/2009 | Wolowelsky | G01N 21/3518 382/103 |
| 2009/0324103 | A1* | 12/2009 | Gelfand | G06F 17/30265 382/224 |
| 2010/0172581 | A1* | 7/2010 | Husoy | G06K 9/00261 382/165 |
| 2011/0249136 | A1* | 10/2011 | Levy | G06K 9/00912 348/222.1 |
| 2012/0033872 | A1* | 2/2012 | Cho | G06T 15/205 382/154 |
| 2015/0016733 | A1 | 1/2015 | Park et al. | |
| 2016/0059890 | A1* | 3/2016 | Lee | B62D 15/028 701/41 |

* cited by examiner

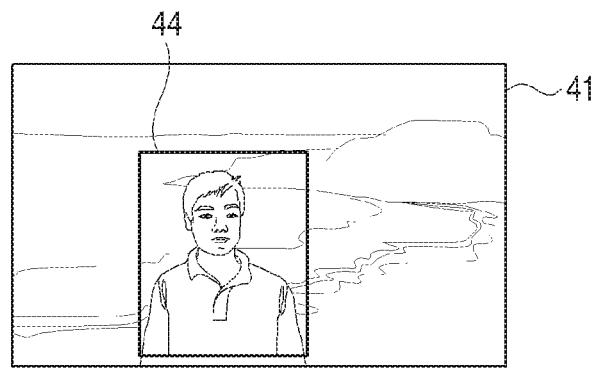
FIG. 4A  DETECT SUBJECT AREA
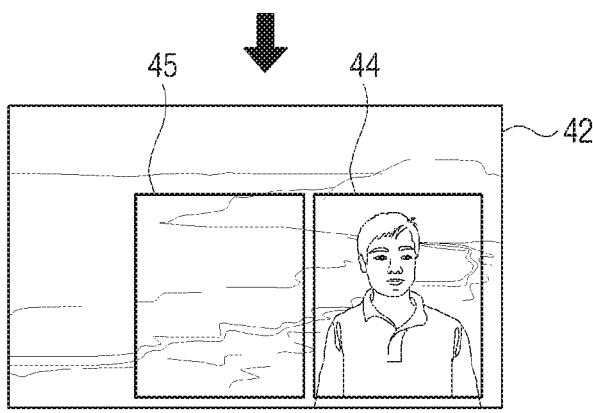
FIG. 4B  DETECT LOCAL IMAGE AREA
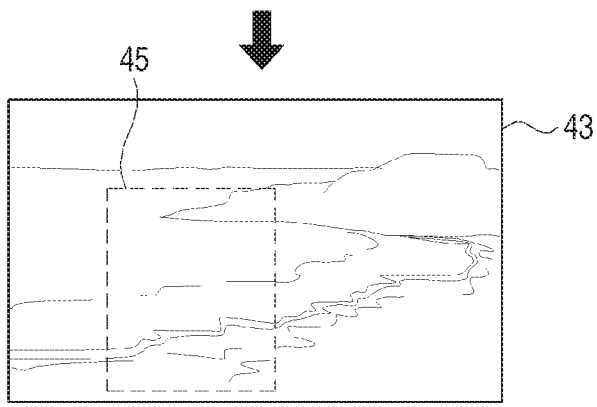
FIG. 4C  GENERATE BACKGROUND IMAGE FROM WHICH SUBJECT IS REMOVED

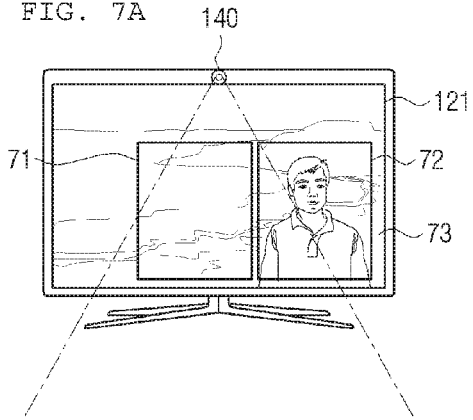
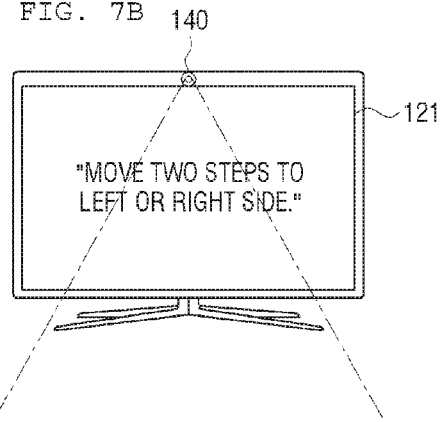
FIG. 7A
FIG. 7B
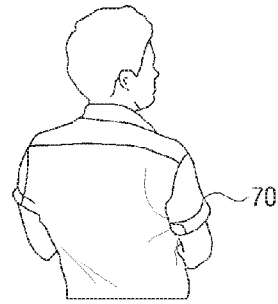
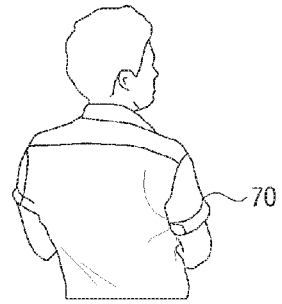

FIG. 8
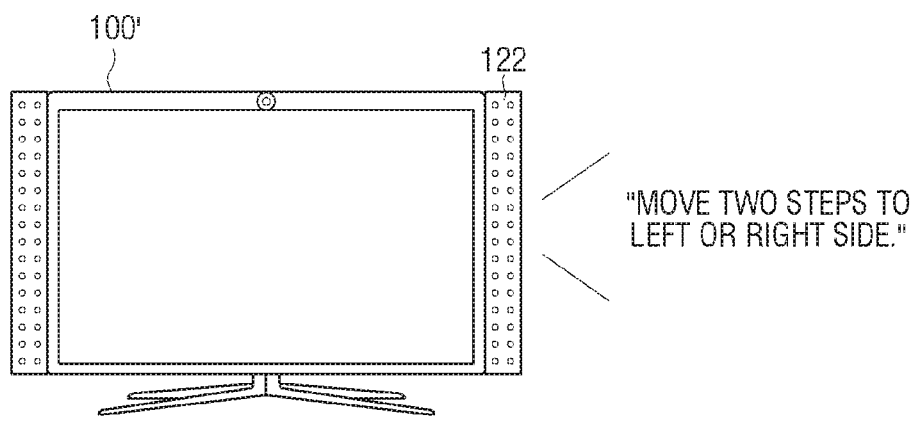
"MOVE TWO STEPS TO LEFT OR RIGHT SIDE."
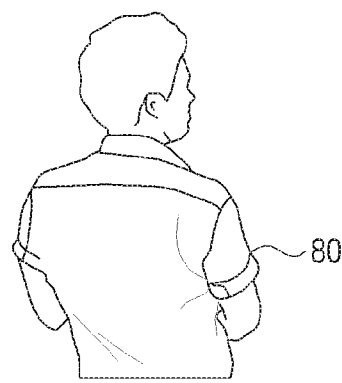

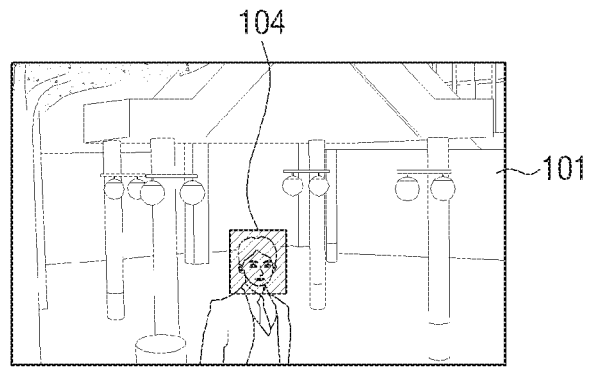
FIG. 10A  1ST FRAME
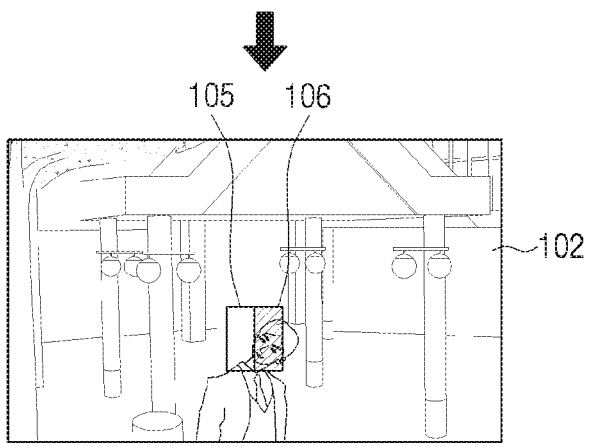
FIG. 10B  STORE LEFT-HALF IMAGE
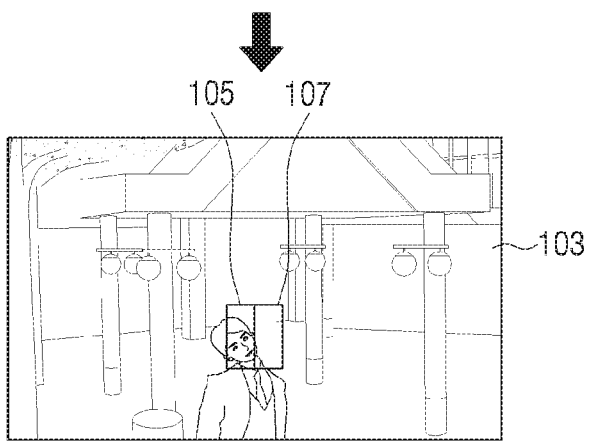
FIG. 10C  STORE RIGHT-HALF IMAGE

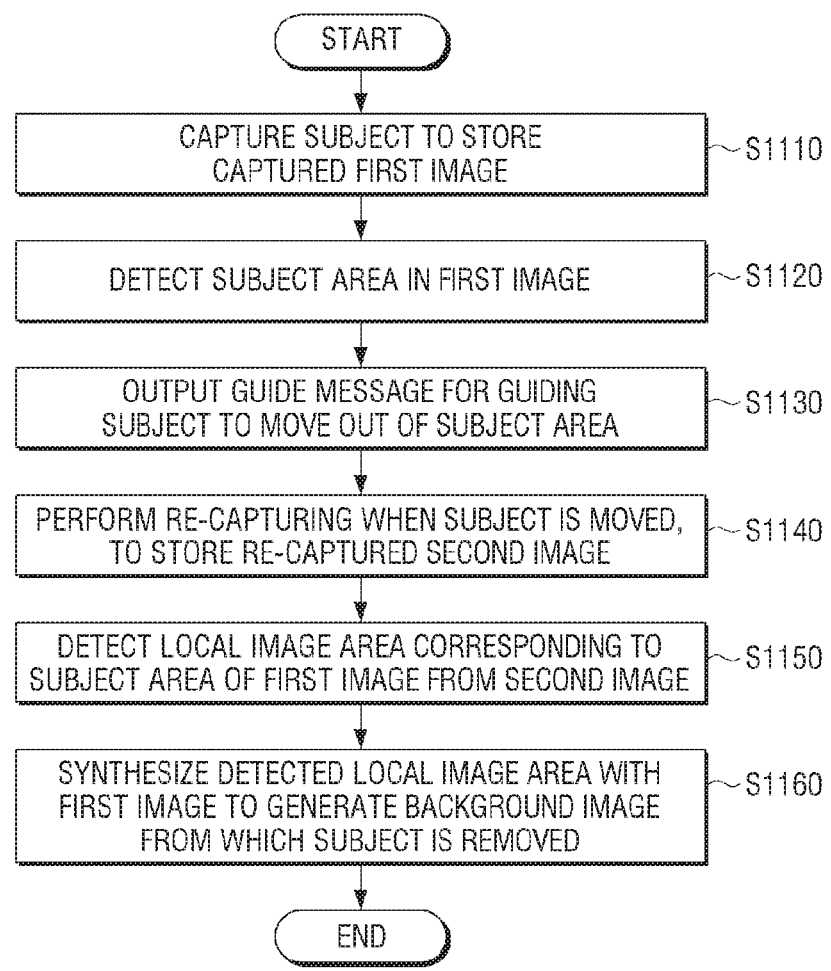

DISPLAY APPARATUS FOR GENERATING A BACKGROUND IMAGE AND CONTROL METHOD THEREOF

CROSS-REFERENCE TO RELATED APPLICATIONS

This application claims priority from Korean Patent Application No. 10-2014-0159026, filed on Nov. 14, 2014, in the Korean Intellectual Property Office, the disclosure of which is incorporated herein by reference in its entirety.

BACKGROUND

1. Field

Apparatuses and methods consistent with the present disclosure relate to a display apparatus and an image processing method thereby, and more particularly, to a display apparatus that extracts and displays pixels of a subject from an image that is being captured, and an image processing method thereby.

2. Description of the Related Art

A technology for separating a subject and a background from an image is used in various types of vision systems including a video surveillance, human counting, video editing, etc. In particular, a video conversation that uses a voice and an image together has been recently commercialized with the development of the Internet and the advent of web cameras. In this video conversation, there are parts of the image, such as a background, that a person may not want to be exposed by the camera. Therefore, a person who acts as a subject may be separated from a background to replace the background with a new background and to transmit the new background instead so as to protect privacy of the person. Also, a background of an image that is currently captured may be replaced to create an effect as if a person is in a location different than the actual location of the person. According to a background replacement technology as described above, a subject and a background are first separated from an image.

An existing image separating technology includes a method of removing only a pixel corresponding to a pre-given background from a current input image to extract only a person pixel from an image if information about a background is pre-given. For example, there is a method of arranging a screen of a pre-given color or pattern behind a person, a method of pre-capturing, storing, and using a background when a person does not exist, etc. Also, if information about a background is not pre-given, a person pixel may be extracted from an image by using a method of enabling a user to move out of a view angle of a camera so as to learn the background when performing initial capturing, a method of assuming that a pixel, which is not changed for several frames, is a background and learning the background, or the like.

However, existing technologies for learning a background have various restrictive conditions. In other words, there is a problem of arranging a private screen, forcing a person to move far away from a view angle of a camera when performing initial capturing, or taking a long time to extract a pixel that is not changed for several frame.

Therefore, the inventors of current disclosure have determined there is a need for methods for a user to receive feedback to accurately learn a background in real time so as to further conveniently and efficiently extract a person pixel from an image that is captured.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a display apparatus that efficiently moves a subject in an image, which is captured, to generate a complete background image from which a subject is removed so as to extract the subject, and an image processing method thereby.

According to an aspect of the present disclosure, an image processing method of a display apparatus is described. The image processing method may include, in response to a subject being captured, storing a captured first image, detecting a subject area in the first image, outputting a guide message for guiding the subject so as to move out of the subject area, in response to the subject being moved and re-capturing being performed, storing a re-captured second image, detecting a local image area corresponding to the subject area of the first image from the second image, and synthesizing the detected local image area with the first image to generate a background image from which the subject is removed.

The image processing method may further include capturing the subject to acquire a third image, and comparing the background image with the third image to separate a subject image from the third image and display the subject image.

The displaying of the subject image may include synthesizing the subject image separated from the third image with a pre-stored background image to display the synthesized image.

The guide message may be a graphical user interface (GUI) message displayed on a display unit displaying the first image to indicate a direction and a distance to which the subject is to move.

The guide message may be a voice message that guides a direction and distance to which the subject is to move.

The detecting of the subject area may include detecting a user face part in the first image, and detecting a local area including the user face part as the subject area.

The detecting of the subject area may include capturing the subject sequentially a plurality of times to storing a plurality of first images, and comparing the plurality of first images to detect an area, from which a motion is sensed, as the subject area.

The image processing method may further include dividing the subject area into a plurality of sub areas, and dividing the local image area of the second image into a plurality of sub local image areas respectively corresponding to the plurality of sub areas. The local image area may be synthesized with the first image in units of at least one sub local image areas.

According to another aspect of the present disclosure, a display apparatus includes a storage unit configured to, in response to a subject being captured, store a captured first image, an output unit configured to, in response to the first image being stored, output a guide message for guiding the subject so as to move out of a subject area of the first image, and a controller configured to, in response to the subject being moved and re-capturing being performed, acquire a re-captured second image, detect a local image area corresponding to the subject area of the first image from the second image, and synthesize the detected local image area with the first image to generate a background image from which the subject is moved and store the background image in the storage unit.

The output unit includes a display unit. The controller may control the display unit to capture the subject so as to acquire a third image, compare the background image with the third image, separate a subject image from the third image, and display the subject image.

The controller may control the display unit to synthesize the subject image separated from the third image with a pre-stored background image and display the synthesized image.

The guide message may be a GUI message displayed on the display unit displaying the first image to indicate a direction and a distance to which the subject is to move.

The guide message may be a voice message for guiding a direction and a distance to which the subject is to move.

The controller may detect a user face part in the first image and detect a local area including the user face part as a subject area.

The storage unit may capture the subject sequentially a plurality of times to store a plurality of first images. The controller may compare the plurality of first images to detect an area, from which a motion is sensed, as a subject area.

The controller may detect a subject area including the subject in the first image, divide the subject area into a plurality of sub areas, divide the local image area detected from the second image into a plurality of local image areas respectively corresponding to the plurality of sub areas, and synthesize at least one sub local image areas with the first image.

According to an aspect of the present disclosure, an image capturing method may include capturing a first image of a subject, using a camera, and detecting a subject area including the subject within the captured first image, transmitting a signal from the camera to a mobile device, the signal including a command causing the mobile device to output a guide message to guide the subject to move out of the subject area of the image while staying within an area of the captured first image, and capturing a second image of the subject, using the camera, after the subject has moved out of the subject area in accordance with the guide message.

In the image capturing method, the guide message may include at least one of a GUI message, displayed on a display screen of the mobile device, that indicates a direction and a distance in which a subject is to move, and a voice message, output through a speaker unit of the mobile device, that indicates the direction and the distance in which the subject is to move.

According to an aspect of the present disclosure, an image processing method of a display apparatus is described. The image processing method may include detecting a subject area in a captured first image of a subject and a background area, outputting a guide message for guiding the subject to move out of the subject area, re-capturing the subject and the background area in a second image after the subject has moved out of the subject area, in accordance with the guide message, detecting, from the second image, a local image area corresponding to the detected subject area of the first image, and synthesizing the detected local image area with the captured first image to generate a background image including the background area from which the subject has been removed.

According to various exemplary embodiments of the present disclosure as described above, a motion of a user may be minimized, and a background image may be quickly and conveniently acquired so as to improve a convenience of the user.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects of the present disclosure will be more apparent by describing certain exemplary embodiments of the present disclosure with reference to the accompanying drawings, in which:

FIGS. 4A, 4B, and 4C illustrate a method of generating a background image from which a subject is removed, according to an exemplary embodiment of the present disclosure;

FIGS. 7A, 7B, 8, and 9 illustrate methods of outputting a guide message for guiding a subject so as to move, according to various exemplary embodiments of the present disclosure;

FIGS. 10A, 10B, and 10C illustrate a method of generating a background image from which a subject is removed, according to another exemplary embodiment of the present disclosure;

FIG. 11 is a flowchart of an image processing method for generating a background image from which a subject is removed, according to an exemplary embodiment of the present disclosure.

DETAILED DESCRIPTION

Figure 1:
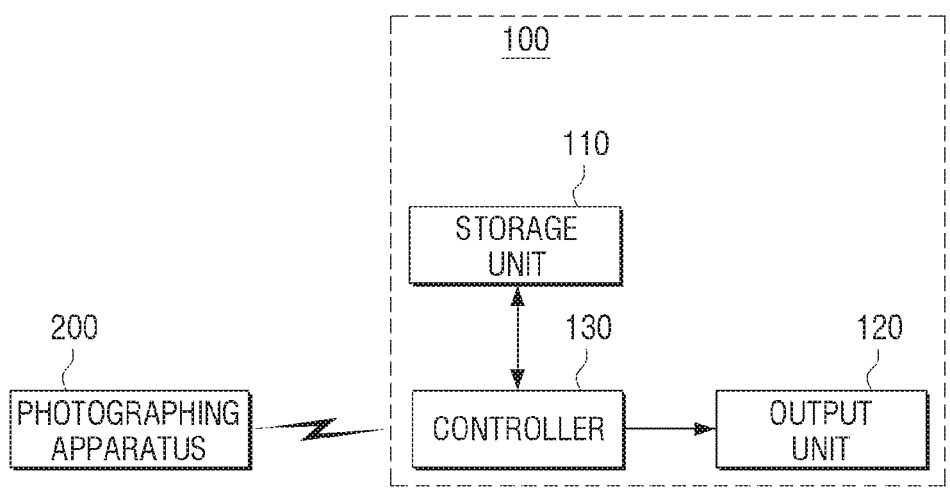
FIG. 1 is a block diagram of a simple structure of a display apparatus according to an exemplary embodiment of the present disclosure.
Figure 2:
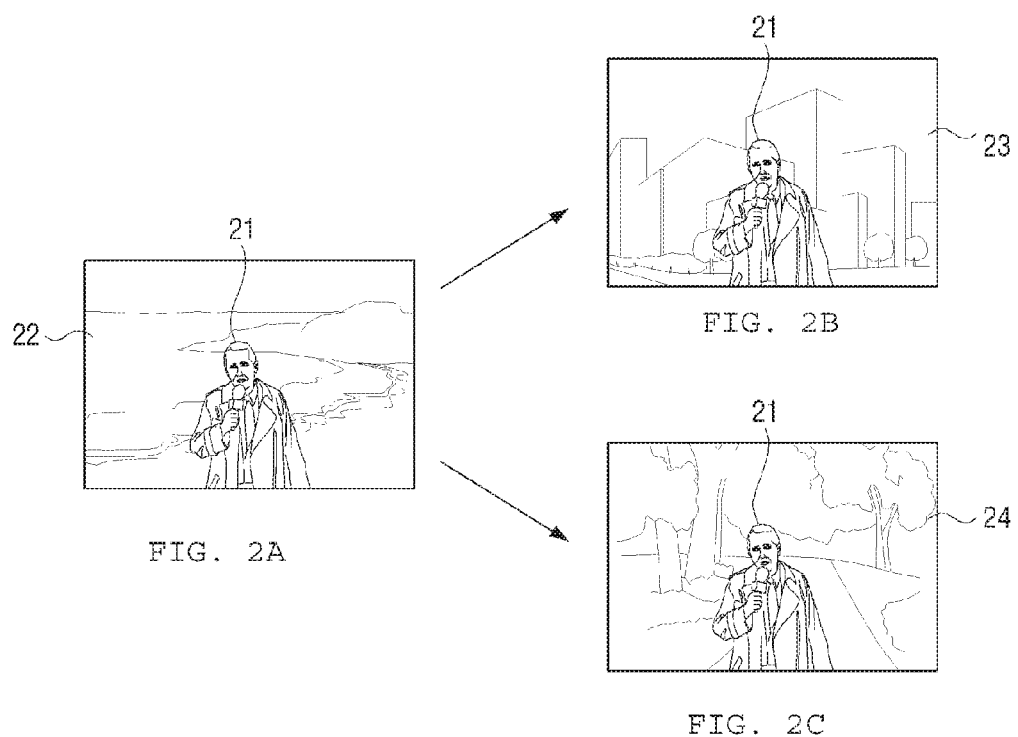
FIGS. 2A, 2B, and 2C illustrate a method of separating a subject from a captured image to synthesize the subject with a new background, according to an exemplary embodiment of the present disclosure.

Certain exemplary embodiments of the present disclosure will now be described in greater detail with reference to the accompanying drawings.

In the following description, same drawing reference numerals are used for the same elements even in different drawings. The matters defined in the description, such as detailed construction and elements, are provided to assist in a comprehensive understanding of the disclosure. Thus, it is apparent that the exemplary embodiments of the present disclosure can be carried out without those specifically defined matters. Also, well-known functions or constructions are not described in detail since they would obscure the disclosure with unnecessary detail.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

FIG. 1 is a block diagram of a simple structure of a display apparatus 100 according to an exemplary embodiment of the present disclosure.

Referring to FIG. 1, the display apparatus 100 may include, for example, a storage unit 110, an output unit 120, and a controller 130.

The display apparatus 100 may be realized as various types of monitors, including a TV, capable of processing images, a smartphone, a portable terminal, a mobile terminal, a personal digital assistant (PDA), a portable multimedia player (PMP) terminal, a computer, a notebook computer, a note pad, a Wibro terminal, a tablet PC, a smart TV, or the like.

A photographing apparatus 200 is an element that acquires an image through capturing. The photographing apparatus 200 may include a camera, a video camera, or the like. However, the photographing apparatus 200 is realized as an external apparatus that is connected to the display apparatus 100 as described with reference to FIGS. 1 through 4C but may be an element included in the display apparatus 100. A subject may be captured by the photographing apparatus 200 so as to acquire a first image, and re-capturing may be performed when the subject moves, so as to acquire a second image. Also, a third image, from which the subject is to be separated, may be acquired by the photographing apparatus 200.

The storage unit 110 is an element that stores a moving picture or an image that is captured by the photographing apparatus 200. The storage unit 110 may store the first, second, and third images acquired by the photographing apparatus 200. The storage unit 110 may also store a background image from which the subject has been removed through image processing and store a subject image that is separated from the third image by using the acquired background image. Also, the storage unit 110 may store various types of software modules and pieces of related information for processing an image to generate a background image from which the subject is removed and may output information about this to the controller 130.

A captured image may be stored in the storage unit 110 and in a system that accesses a network. In this case, an image may be remotely transmitted and reproduced by using a communicator (not shown).

The controller 130 controls an overall operation of the display apparatus 100.

In particular, the controller 130 may control the photographing apparatus 200 to acquire the first, second, and third images, detect a subject area from the first image, and mark the subject area. Here, the subject area refers to an area including a subject. The subject area may be marked in a minimum size. In other words, the subject area may be an area that is marked along an edge of the subject. Alternatively, an area having a particular shape and including a part of the subject may be marked as the subject area. In this case, the subject area may be marked in a rectangular shape, a circular shape, an elliptical shape, a silhouette (or a contour shape) of the subject, or the like. A method of detecting a subject area will be described in detail later.

If a subject area is detected from a first image, the controller 130 may detect a local image area corresponding to the detected subject area from a second image. Here, the local image area refers to a partial image of the whole second image having a size, a position, and a shape corresponding to the subject area of the first image when comparing the first and second images. In detail, the local image area of the second image may be a background area of a whole background of the first image that is covered by a subject.

Although a position of a subject is moved when a position and a capturing direction of the photographing apparatus 200 are fixed, the local image area is fixed on a screen at all times. Therefore, if the position of the subject is moved, the local image area corresponds to an area where the subject exists, i.e., a background area covered by the subject. In other words, the local image area of the second image is equal to a subject area marked in the first image. Therefore, if the position of the subject is moved, the controller 130 may detect the local image area from the second image.

The controller 130 may also synthesize the detected local image area with the first image to generate a background image from which the subject is removed and may store the generated background image in the storage unit 120. In detail, the controller 130 may generate the background image from which the subject is removed, according to a method of replacing the subject area marked in the first image with the local image area acquired from the second image.

Here, the controller 130 may make the marked subject area into one unit and replace the one unit at the same time or may divide the marked subject area into a plurality of areas, make the plurality of areas into one unit, and replace the one unit. In detail, the controller 130 may divide the marked subject area into a plurality of sub areas and divide the local image area, which is detected from the second image, into a plurality of sub local image areas so as to enable the plurality of sub local image areas to correspond to the plurality of sub areas. In this case, the controller 130 may replace a subject area, which is marked in each of the sub areas, with a sub local image area.

Also, the controller 130 may compare the generated background image with the third image acquired from the photographing apparatus 200 to separate a background and a subject image from the third image. In an embodiment, the subject image is an image including only the subject without any of the background image. Here, the third image is an image that is captured to actually separate a subject image differently from the first and second images. Here, the background captured from the third image may be equal to a background acquired when a background image is generated. Here, the separation between the background and the subject image is to determine whether each of pixels of one image corresponds to a subject or a background. That is, by comparing the generated background image with the third image the subject may be separated from the background image in the third image and the subject image may be displayed without the background image.

The controller 130 may remove an area, where a pre-generated background image and a pixel value correspond to each other, from the third image to extract only a pixel corresponding to a person from the third image. Here, the area where the pre-generated background image and the pixel value correspond to each other may refer to an area having a value higher than or equal to a preset similarity. A background image and a similarity are calculated in each pixel corresponding to the third image to compare the background image and the third image. Also, each pixel is classified as one selected from a subject and a background according to a similarity. For example, if the similarity is high, each pixel may be classified as a background pixel. If the similarity is low, each pixel may be classified as a subject. Here, the controller 130 may generate a pixel group based on a difference between colors of one or more pixels forming an image and compare a background image and the third image in each generated pixel group. If an area corresponding to a background image is removed from the third image, an image from which a background except a subject is removed may be generated. As described above, an image including only a generated subject may be synthesized with a pre-stored new background and then displayed. An element that synthesizes an image including only a subject with a new background will now be described with reference to 2A, 2B, and 2C.

FIGS. 2A, 2B, and 2C illustrate a method of separating a subject from a captured image and synthesizing the subject with a new background, according to an exemplary embodiment of the present disclosure.

Referring to FIGS. 2A, 2B, and 2C, a person 21 that is a subject of the image may be extracted from a third image 22 that is captured. The person 21 may be synthesized with a new background so as to be seen as if the person 21 is located in the middle of a city 23 or a forest 24 rather than on a beach where the person 21 is actually located. An image synthesized as described above may be used in a one-to-one video conversation system or a one-to-many or broadcast video conference system.

Referring to FIG. 1 again, the controller 130 may detect a user face part from the first image by using a face detecting and tracking algorithm and may detect a local area including the user face part as a subject area. Here, a subject may be a person. Also, the local area including the user face part may include only a face area of a person or may be set to include a whole body area of the person based on the detected face area.

The face detecting algorithm may, for example, use an omega detection algorithm using a head and shoulders of the person or learning-based algorithms (e.g., an Addaboost learning algorithm, etc.) for detecting a face of a person by using learned face image data. The face tracking algorithm may, for example, use a histogram-based mean-shift tracking method. An algorithm using a mean-shift tracking method refers to an algorithm for moving a center toward an average of pieces of neighboring data existing around particular data to collect similar data.

If a user face is detected, the controller 130 may mark a local area including the user face, and the marked local area may have a minimum size including the user face or a whole body area of a user. The local area may be marked as a rectangular shape, a circular shape, an elliptical shape, a silhouette (or a contour shape) of a subject, or the like.

The controller 130 may also compare a plurality of first images of a subject that are sequentially captured a plurality of times by the photographing apparatus 200, to detect an area, from which a motion is sensed, as a subject area. The controller 130 may analyze and determine a degree of a central position of the area, from which the motion is sensed, changing with time, and, when the degree exceeds a preset range, determine the area, from which the motion is sensed, as a subject area.

The output unit 120 is an element that outputs a guide message guiding a subject so as to move from a subject area of a first image. The output unit 120 may be realized as a display unit or a speaker unit or may include the display unit and the speaker unit.

If the output unit 120 is realized as the display unit, the display unit may output a graphical user interface (GUI) message that guides a direction and a distance to which a subject is to move, so as to enable the subject to move on a display panel displaying a first image. A marked subject area may be displayed in the first image displayed through the display unit. Therefore, the user may look at the displayed first image to check a position of the user so as to estimate a direction and a distance in which the subject is to move and so as to move out of a subject area. In this case, the GUI message may be a figure such as a rectangle or a circle marking a subject area.

According to another exemplary embodiment, the GUI message may be displayed as a sentence such as "Move two steps to the left or right side.", "Move 2 m to the left or right side.", or the like, a figure such as an arrow or the like displaying a movement direction, a number indicating a movement distance, or the like. Alternatively, the display unit may display a message including a first image where a subject area is marked, a sentence, a figure, or a number guiding a movement direction and a movement distance, or the like.

If the output unit 120 is realized as the speaker unit, the speaker unit may output a voice message guiding a direction and a distance to which a subject is to move. The voice message may be output as a voice such as "Move two steps to the left or right side.", "Move 2 m to the left or right side.", or the like. Therefore, the user may check a position of the user with the voice to check a direction and a distance to which the user is to move, so as to move out of a subject area.

The controller 130 may control the output unit 120 to guide a subject so as to move out of a subject area, calculate a direction and a distance to which the subject is to move, and transmit the direction and the distance to the output unit 120.

Figure 3:
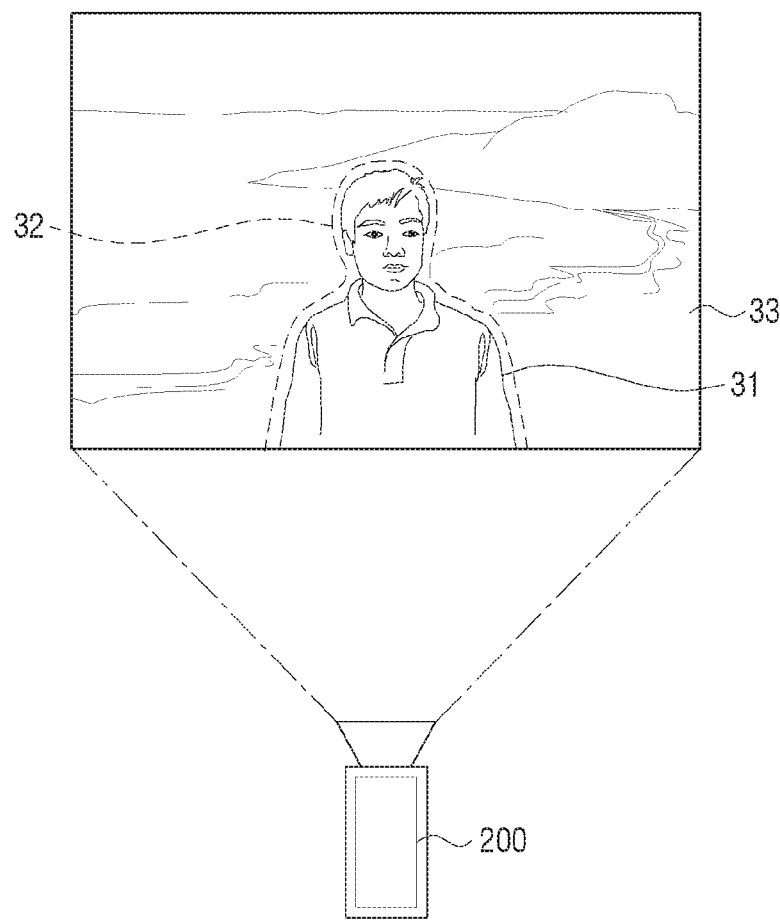
FIG. 3 illustrates a method of generating an area covered by a subject in an image that is being captured, according to an exemplary embodiment of the present disclosure.

FIG. 3 illustrates a method of generating an area covered by a subject in an image that is being captured, according to an exemplary embodiment of the present disclosure.

Referring to FIG. 3, if a subject 31 is captured by the photographing apparatus 200, information about a background 33 may be acquired to separate the subject 31 from the background 33. If the information about the background 33 is acquired, the background 33 learned through the acquired information and an area corresponding to another pixel area may be determined as the subject 31. Also, only an area corresponding to the determined subject 31 may be extracted to separate the background 33 and the subject 31.

However, if the information about the background 33 is not pre-learned, i.e., the information about the background 33 is learned in real time as in the preset specification, an area corresponding to a background covered by the subject 31, i.e., a local image area 32, may not be learned. In this case, if the subject 31 moves, the local image area 32 that is exposed may also be recognized as a subject, and a large amount of noise may occur in a separated subject.

Therefore, complete information about the background 33 is needed to minimize noise so as to separate only the subject 31 from a captured image. Therefore, the local image area 32 covered by the subject 31 is needed to be additionally learned. In this case, the local image area 32 may be exposed due to a movement of a subject and then synthesized with the learned background 33 to generate a background image from which a subject is removed.

FIGS. 4A, 4B, and 4C illustrate a method of generating a background image from which a subject has been removed, according to an exemplary embodiment of the present disclosure.

Referring to FIG. 4A, if a subject is captured, a captured first image 41 may be stored, and a subject area 44 may be detected from the first image. The detected subject area 44 may be marked in a figure having a rectangular shape, and the figure having the rectangular shape may have a minimum size including a subject. If the subject area 44 is detected in the first image 41, the controller 130 may detect a local image area corresponding to the detected subject area 44 from a second image.

Referring to FIG. 4B, the output unit 120 may output a guide message for guiding the subject to move into the subject area 44 and then to get out of the subject area 44. In this case, as the subject is moved out of the subject area 44, a local image area 45 that is a background area previously covered by the subject may be displayed. Also, re-capturing may be performed when the subject is moved, to store a second image 42. Here, the local image area 45 corresponds to an area equal to the subject area 44 of the first image 41. The subject area 44 may be newly detected from the second image 42, and the subject area 44 may also be marked in a figure having a rectangular shape so as to be distinguished from the local image area 45. Here, the figures, which have the rectangular shapes and mark the local image area 45 and the subject area 44, may be distinguished from each other by using different colors. For example, the local image area 45 may be marked in a red figure, such as by a red rectangle, and the subject area 44 may be marked in a blue figure, such as by a blue rectangle. If the local image area 45 is detected from the second image 42, the controller 130 may synthesize the detected local image area 45 with the first image 41 to generate a background image 43 from which the subject has been removed.

Referring to FIG. 4C, the subject area 44 of the first image 41 may be replaced with the local image area 45 of the second image 42 to generate the complete background image 43 from which the subject has been removed. Here, the controller 130 may make the subject area 44 marked in the first image 41 into one unit and replace the one unit at the same time or may divide the subject area 44 marked in the first image 41 into a plurality of areas, make the plurality of areas (or sub areas) into one unit, and replace the one unit. For example, if the subject slowly moves to the left side, a plurality of divided local image areas (or sub local image areas) corresponding to a plurality of divided sub areas may be respectively replaced.

The first image 41, the second image 42, and the background image (or a third image) 43 may be images that are respectively separately captured or images that are sequentially captured.

Figure 5:
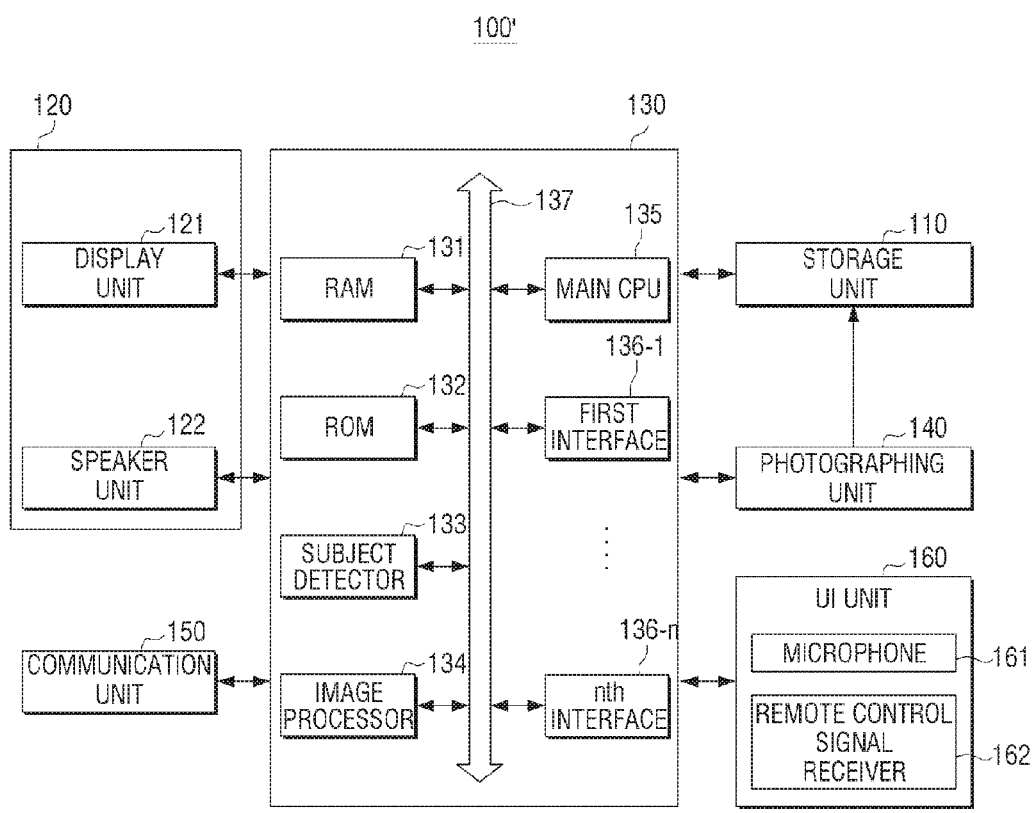
FIG. 5 is a block diagram of a detailed structure of a display apparatus, according to another exemplary embodiment of the present disclosure.

FIG. 5 is a block diagram of a detailed structure of a display apparatus 100' according to another exemplary embodiment of the present disclosure. As shown in FIG. 5, the display apparatus 100' includes a storage unit 110, an output unit 120, a controller 130, a photographing unit 140, a communicator 150, and a user interface (UI) unit 160. The display apparatus 100' of FIG. 5 may be realized to include a display unit 121 and a speaker unit 122 as the output unit 120. Here, the same descriptions of elements of FIG. 5 as those of the elements of FIG. 1 are omitted.

The storage unit 110 stores a captured image, a background image generated by processing the captured image, a subject image, and various types of modules for driving the display apparatus 100'. In particular, a structure of the storage unit 110 will now be described with reference to FIG. 6.

Figure 6:
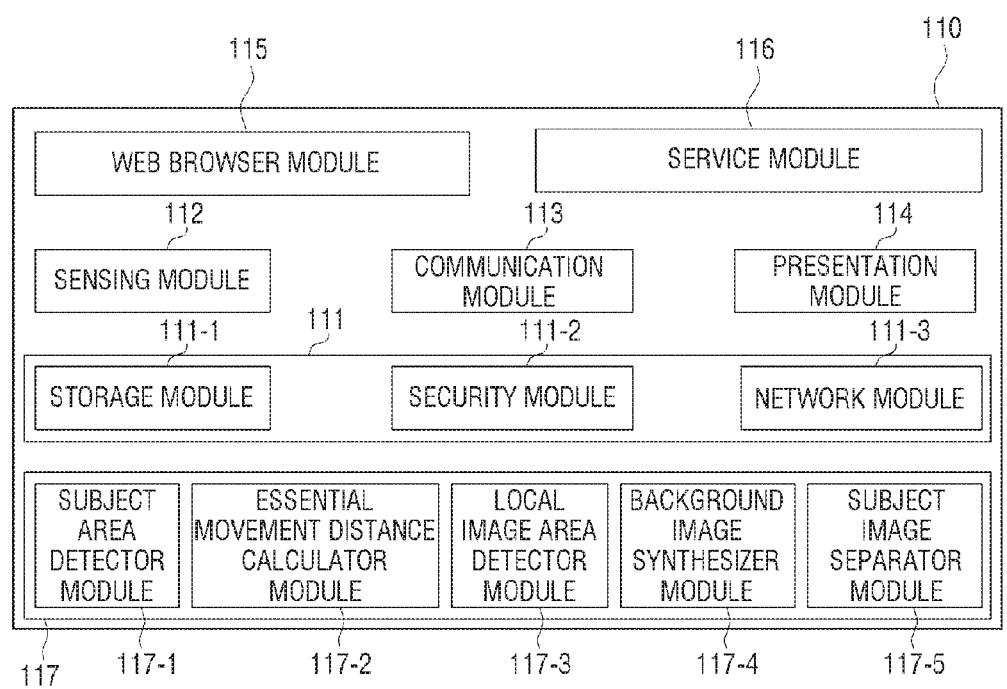
FIG. 6 is a block diagram of a detailed structure of a storage unit according to an exemplary embodiment of the present disclosure.

FIG. 6 is a block diagram of a detailed structure of the storage unit 110, according to an exemplary embodiment of the present disclosure.

Referring to FIG. 6, the storage unit 110 may store software including a base module 111, a sensing module 112, a communication module 113, a presentation module 114, a web browser module 115, a service module 116, and a background image generator module 117.

The base module 111 refers to a base module that processes signals respectively transmitted from pieces of hardware included in the display apparatus 100' and transmits the processed signals to an upper layer module. A storage module 111-1 is a program module that manages a database (DB) or a registry. A security module 111-2 is a program module that supports a certification, a permission, a security storage, or the like of hardware, and a network module 111-3 is a module that supports a network connection.

The sensing module 112 is a module that collects information from various types of sensors, and analyzes and manages the collected information.

The communication module 113 is a module that performs communications with an external apparatus. The communication module 113 may include a messaging module and a phone module.

The presentation module 114 is a module that forms a display screen. The presentation module 114 includes a multimedia module that plays and outputs a multimedia content and a UI rendering module that processes a GUI and a graphic.

The web browser module 115 is a module that performs web browsing to access a web server.

The service module 116 is a module that includes various types of applications for providing various services. In detail, the service module 116 may include various types of program modules such as a Social Network Service (SNS) program, a content play program, etc.

The background image generator module 117 is an element that includes various types of modules for generating a background image and separating a subject image by using the generated background image and may include a subject area detector module 117-1, an essential movement distance calculator module 117-2, a local image area detector module 117-3, a background image synthesizer module 117-4, and a subject image separator module 117-5.

The subject area detector module 117-1 may detect a pixel area corresponding to a subject in first and second images. The subject area detector module 117-1 may detect a user face part from an image by using a face detecting and tracking algorithm and detect a local area including the user face part as a subject area. The face detecting algorithm may, for example, be an omega detection algorithm using head and shoulder shapes of a person or learning-based algorithms (e.g., Addaboost learning algorithm, etc.) for detecting a face of a person by using learned face image data. The face tracking algorithm may, for example, be an algorithm using a histogram-based mean-shift tracking method.

The subject area detector module 117-1 may capture a subject sequentially a plurality of times, compare a plurality of first image, and detect an area, from which a motion is sensed, as a subject area. The subject area detector module 117-1 may analyze and determine a degree of a central area of an area, from which the motion is sensed, changing with time. When the degree exceeds a preset range, the subject area detector module 117-1 may determine the area, from which the motion is sensed, as a subject area.

The essential movement distance calculator module 117-2 is an element that calculates how much the subject is to move in order to allow the subject to get out of the subject area. The essential movement distance calculator module 117-2 may estimate a size and a position of the subject to calculate how much the subject is to move from the subject area in order to show all of a local image area, in a step unit or a meter unit.

The local image area detector module 117-3 may detect a local image area corresponding to a subject area of a first image from a second image.

The background image synthesizer module 117-4 may synthesize a background image to generate a background image from which a subject is removed, according to a method of replacing a subject area of the first image with a local image area detected from the local image area detector module 117-3.

The subject image separator module 117-5 may compare the background image generated by the background image synthesizer module 117-4 with a third image acquired from the photographing unit 140 to separate a background and a subject image from the third image. In detail, the subject image separator module 117-5 may remove an area, where a pre-generated background image and a pixel value correspond to each other, from the third image to extract only a person pixel from the third image. The subject image separator module 117-5 compares the background image and the third image to calculate a similarity of each pixel of the third image with respect to the background image. Each pixel is classified as one selected from a subject and a background according to the similarity. For example, if the similarity is high, each pixel may be classified as a background pixel. If the similarity is low, each pixel may be classified as a subject.

As illustrated in FIG. 6, various types of modules have been described. Some of the modules may be omitted or changed according to a type, a characteristic, or the like of the display apparatus 100'. For example, if the display apparatus 100' does not have an Internet function, the web browser module 115 may be omitted.

Referring to FIG. 5 again, the controller 130 controls an overall operation of the display apparatus 100' by using various types of modules stored in the storage unit 110.

The controller 130 includes a random access memory (RAM) 131, a read only memory (ROM) 132, a subject detector 133, an image processor 134, a main central processing unit (CPU) 135, first through $n^{th}$ interfaces 136-1 through 136-n, and a bus 137. Here, the RAM 131, the ROM 132, the subject detector 133, the image processor 134, the main CPU 135, the first through $n^{th}$ interfaces 136-1 through 136-n, etc. may be connected to one another through the bus 137.

The ROM 132 stores a command set, etc. for booting a system. The main CPU 135 copies various types of application programs stored in the storage unit 110 into the RAM 131 and executes the application programs copied into the RAM 131 to perform various types of functions.

The subject detector 133 is an element that detects a subject from a first image by using a subject area detector module stored in the storage unit 110. The subject detector 133 may detect a user face part in the first image by using a face detecting and tracking algorithm to detect a local area including the user face part as a subject area. Alternatively, the subject detector 133 may compare a plurality of first images acquired by capturing a subject sequentially a plurality of times through the photographing unit 140, analyze and determine a degree of a central position of an area, from which a motion is sensed, changing with time, and determine the area, from which the motion is sensed, as a subject area when the degree exceeds a preset range. For this, the subject detector 133 may include a motion detecting sensor. The motion detecting sensor includes various types of sensors such as an acceleration sensor, a geomagnetic sensor, etc.

The image processor 134 is an element that performs image-processing on a captured image. The image processor 134 may perform various types of image-processing, such as decoding, scaling, noise filtering, a frame rate conversion, a resolution conversion, etc., on the captured image. In particular, the image processor 134 may perform image-processing to mark a subject area and a local image area detected from the image and synthesize a first image by using a method of replacing a subject area of a first image with a detected local image area so as to generate a background image from which a subject is removed.

The main CPU 135 accesses the storage unit 110 to perform booting by using an O/S stored in the storage unit 110. The main CPU 135 also performs various operations by using various types of programs, contents, data, etc. stored in the storage unit 110.

The first through $n^{th}$ interfaces 136-1 through 136-n are connected to various types of elements as described above. One of the first through $n^{th}$ interfaces may be a network interface that is connected to an external apparatus through a network.

The communication unit or communicator 150 is an element that performs communications with various types of external apparatuses or external servers according to various types of communication methods. The communicator 150 may include various types of communication chips such as a WiFi chip, a Bluetooth chip, a near field communication (NFC) chip, a wireless communication chip, etc. The communicator 150 may communicate with an external display apparatus or an external speaker so as to enable the external display apparatus or the external speaker to output a guide message for guiding a subject so as to move out of a subject area. If the display apparatus 100' does not include a photographing apparatus, the communicator 150 may communicate with the photographing apparatus to receive data about an image that is captured.

The photographing unit 140 is an element that is included in the display apparatus 100' including the photographing apparatus and that performs a general digital camera function under control of the controller 130 to capture visible light input from an external object that is to be captured. The photographing unit 140 may be a photographing unit including a charge-coupled device (CCD) imaging device, etc. and may further include an illumination sensor for measuring an illumination intensity, a distance sensor for measuring a focal distance from a subject, etc. The controller 130 may process image data output from the photographing unit 140 to convert the image data into digital image data having an appropriate format.

The UI unit 160 is an element that senses a user interaction for controlling an overall operation of the display apparatus 100'. In particular, as shown in FIG. 5, the UI unit 160 may include various types of interaction sensing devices such as a microphone 161, a remote control signal receiver 162, etc.

FIGS. 7A, 7B, 8 and 9 illustrate methods of outputting a guide message for guiding a subject so as to move, according to various exemplary embodiment of the present disclosure.

FIGS. 7A and 7B illustrate a method of outputting a guide message for enabling a person to get out of a subject area through a display unit when a photographing apparatus is realized to be included in a display apparatus.

As shown in FIGS. 7A and 7B, a display apparatus 100' may include a photographing unit 140 and a display unit 121. Therefore, the display apparatus 100' may output a GUI message on a display panel displaying a first image 73 to guide the person 70 so as to move from a subject area 71, wherein the GUI message indicates a direction and a distance in which the person 70 is to move. Here, as shown in FIG. 7A, the GUI message may be output in a form displaying the subject area 71, which is an area where the person 70 is positioned in the first image 73. In this case, a user may check a position of the user from the subject area 71 displayed on the display unit 121 to completely move out of the subject area 71.

As shown in FIG. 7B, the GUI message may be output on the display unit 121 as a message such as "Move two steps to the left or right side." or the like. The display apparatus 100' calculates a size and a position of the person 70 to derive the distance and the distance to which the person 70 is to move in order to get out of the subject area 71, and outputs the direction and the distance in meter units or step units. In this case, the user may obtain information indicating how much the user is to move in order to get out of the subject area 71, according to a command displayed on the display unit 121.

FIG. 8 illustrates a method of outputting a guide message through a speaker unit of a display apparatus so as to enable a person to get out of a subject area.

As shown in FIG. 8, a message, such as "Move two steps to the left or right side.", may be output through a speaker or speaker unit 122. A display apparatus 100' according to the present exemplary embodiment may guide the user through a voice to a direction and a distance to which a user is to move in order to get out of a subject area.

A display apparatus as shown in FIGS. 7A, 7B, and 8 may output a GUI message through a display unit and output a voice message through a speaker unit to guide a direction and a distance to which a subject is to move.

Figure 9:
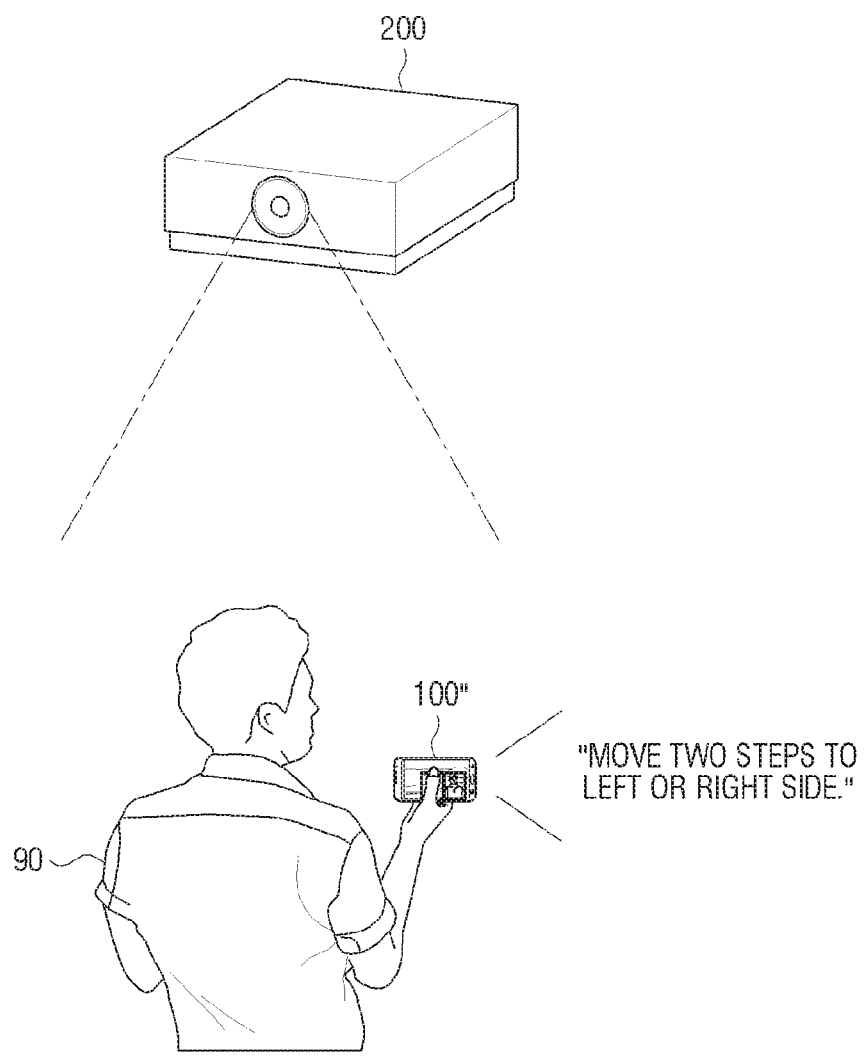

FIG. 9 illustrates a method of enabling a photographing apparatus to communicate with a user terminal device to output a guide message through the user terminal device so as to enable a person to move out of a subject area.

As shown in FIG. 9, a display apparatus may be realized as a user terminal device such as a smartphone or the like. A photographing apparatus 200 may transmit data about an image, which is being captured, to a user terminal device 100" through a communicator. The user terminal device 100" may output a guide message for guiding a subject to move. Here, the photographing apparatus 200 and the user terminal device 100" may be paired to communicate with each other through WiFi, Bluetooth, an NFC method, or the like. Therefore, a user 90 may check a position of the user 90 through the user terminal device 100" that the user 90 carries and check a direction and a distance to which the user 90 is to move in order to get out of a subject area. Here, the guide message may be a GUI message that is displayed through a display unit of the user terminal device 100" and that indicates a direction and a distance to which a subject is to move, a voice message that is output through a speaker unit, or may include both of the GUI message and the voice message. Therefore, the user 90 may conveniently get out of a subject area by using the user terminal device 100" that the user 90 carries.

FIGS. 10A, 10B, and 10C illustrate a method of generating a background image from which a subject has been removed, according to another exemplary embodiment of the present disclosure.

As shown in FIGS. 10A, 10B, and 10C, a subject area may be divided into a plurality of sub areas. Hereinafter, the subject area will be described as being divided into two sub areas. The subject area may be set to include only a face of a user or may be set to include a whole body area of a person according to settings. If an image, where only a position of a face of a person is moved without moving an upper body of a person, is captured as in the present exemplary embodiment, a local image area corresponding to a face part of the person may be detected, and the local image area corresponding to an upper body part of the person does not need to be detected in order to extract the person from the image. Therefore, in this case, the subject area may be set to include only the face of the person. As shown in FIGS. 10A through 10C, the upper body of the person may not be moved, and only a face area of the person may be set to a subject area as in a video conference or the like.

As shown in FIG. 10A, a subject area 104 corresponding to a face of a person is detected in a first image 101. Here, the subject area 104 may be colored to be distinguished from an area outside the subject area 140. Here, the controller 130 may divide the subject area 104 into two sub areas.

As shown in FIG. 10B, the controller 130 may divide a local image area of a second image 102 into two sub local image areas respectively corresponding to the two sub areas. Therefore, if a person tilts a head to the right side according to a guide message on a screen, a sub local image area 105 corresponding to left one of the two sub areas may be displayed. In this case, the display apparatus 100 may inform a user that the sub local image area 105 is learned, through the display unit 121. In this case, a color of the sub local image area 105 may be different from a color of a sub local image area 106 that is displayed on the right side or a pre-processed color of the sub local image area 105 may be canceled to be distinguished from the color of the sub local image area 106. Here, the sub local image area 105 may be synthesized with a first image in units of sub local image areas.

As shown in FIG. 10C, if the person tilts the head to the left side according to the guide message on the screen, a sub local image area 107 corresponding to the right one of the two sub areas may be displayed. In this case, the display apparatus 100 may inform the user that the sub local image area 107 is learned, through the display unit 121. In this case, a color of the sub local image area 107 may be processed in the same color as that of the sub local image area 105 that is on the right side or a pre-processed color the sub local image area 107 may be canceled to be distinguished from the color of the sub local image area 105. Here, the sub local image area 107 may be additionally synthesized with the first image.

FIG. 11 is a flowchart of an image processing method for generating a background image from which a subject is removed, according to an exemplary embodiment of the present disclosure.

As shown in FIG. 11, in operation S1110, a subject is captured to store a captured first image. In operation S1120, a subject area is detected in the first image. The subject area may be detected by using a method including a face tracking algorithm or a method of capturing a subject sequentially a plurality of times to store a plurality of first images and comparing the plurality of first images to detect an area, from which a motion is sensed, as a subject area. In operation S1130, a guide message is output to guide the subject to move out of the subject area. Here, the guide message may be realized as a GUI message that guides a direction and a distance to which the subject is to move on a display panel displaying a first image. Alternatively, the guide message may be realized as a voice message that guides the direction and the distance to which the subject is to move through a speaker unit. In operation S1140, re-capturing is performed when the subject moves, to store a re-captured second image. In operation S1150, a local image area corresponding to the subject area of the first image is detected from a second image. In this case, the subject area may be divided into a plurality of sub areas, and the local image area of the second image may be divided into a plurality of sub local image areas respectively corresponding to the plurality of sub areas. In operation 1160, the detected local image area may be synthesized with the first image to generate a background image from which a subject is removed. Here, the local image area may be synthesized with the first image in units of at least one sub local image areas.

Figure 12:
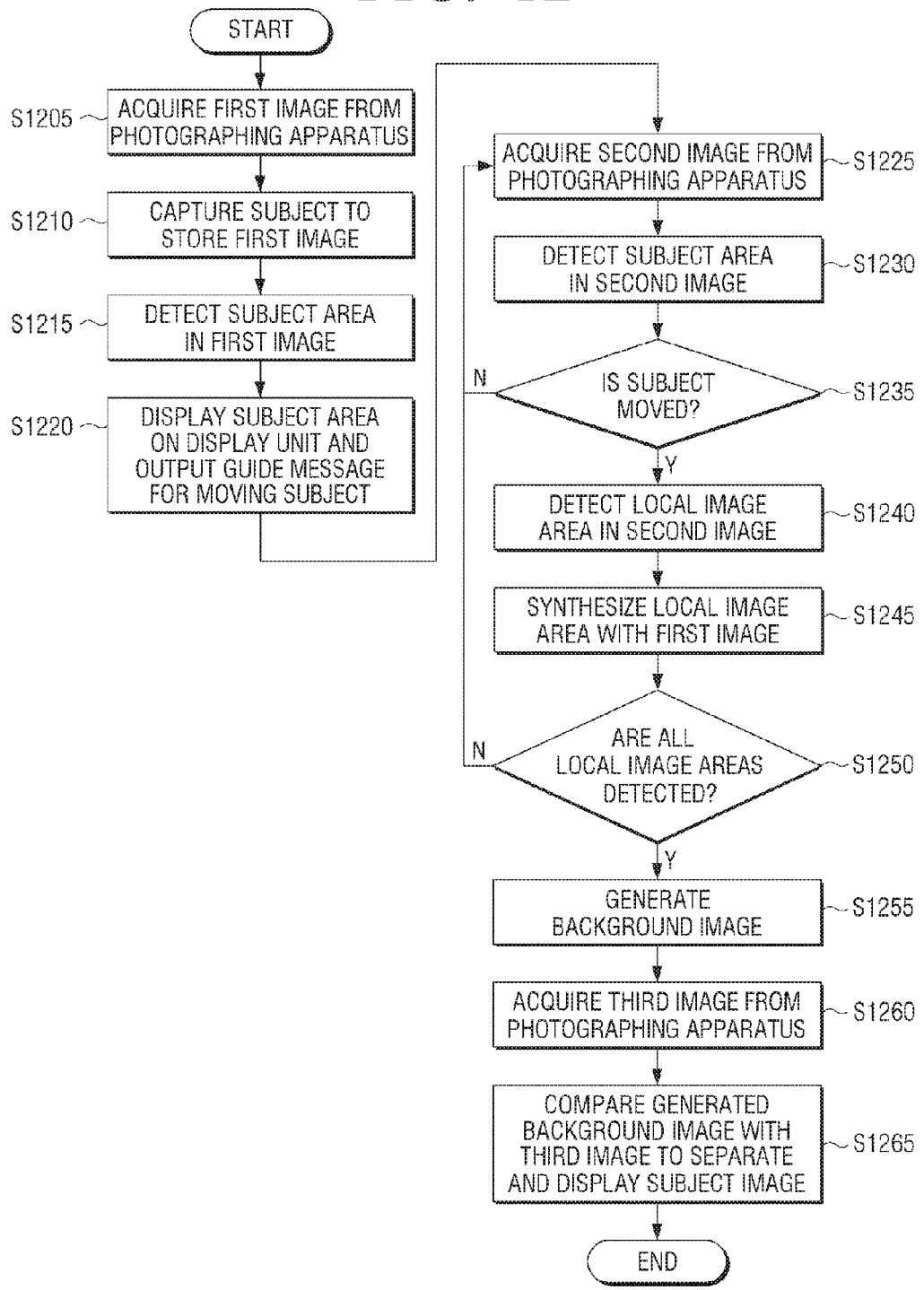
FIG. 12 is a flowchart of an image processing method for generating a background image from which a subject is removed, according to another exemplary embodiment of the present disclosure.

FIG. 12 is a flowchart of an image processing method for generating a background image from which a subject has been removed, according to another exemplary embodiment of the present disclosure.

In operation S1205, a subject is captured by a photographing apparatus to acquire a captured first image. In operation S1210, the acquired first image is stored. In operation S1215, a subject area is detected in the first image. In operation S1220, the subject area is displayed on a display unit, and a guide message is output to guide a subject to move out of the subject area. In operation S1225, the subject is re-captured by the photographing apparatus when the subject moves or after the subject has moved, to acquire a second image. In operation S1230, a subject area is detected in the second image. In operation S1235, a determination is made as to whether a position of the subject has moved, through the detected subject area. If it is determined in operation S1235 that the subject has not moved, a photographing unit sequentially acquires a second image in operation S1225. If it is determined in operation S1235 that the subject has moved, a local image area is detected in the second image in operation S1240. In operation S1245, the detected local image area is synthesized with the first image. If all local image areas are not detected in operation S1250, the photographing unit sequentially acquires the second image in operation S1225. If all local image areas are detected in operation S1250, a background image is generated in operation S1255. In operation S1260, the subject is captured by the photographing apparatus to acquire a third image. In operation S1265, the generated background image and the third image are compared to separate and display a subject image.

According to various exemplary embodiments of the present disclosure as described above, a background image may be generated by using a captured image. The generated background image may be used according to various methods. For example, if another user performs capturing on the same background, only an image of the other user may be accurately extracted by using a background image. Alternatively, the generated background image may be synthesized with a face of the other user to generate a new image.

An image processing method according to the above-described various exemplary embodiments may be embodied as a program and then stored on various types of recording media. In other words, a computer program that is processed by various types of processors to execute various types of image processing methods may be stored and used on a recording medium.

For example, there may be provided a non-transitory computer-readable medium that stores a program performing capturing a subject to store a captured first image, detecting a subject area in the first image, outputting a guide message for guiding the subject so as to move out of the subject area, performing re-capturing when the subject moves, to store a re-captured second image, detecting a local image area corresponding to the subject area of the first image from the second image, and synthesizing the detected local image area with the first image to generate a background image from which the subject is removed.

The non-transitory computer-readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A control method of a display apparatus for generating a background image, the method comprising:
   storing a captured first image of a subject;
   detecting a subject area in the captured first image;
   calculating a direction and distance in which the subject moves in order to get out of the subject area,
   outputting a guide message for guiding the subject to move out of the subject area according to the calculated direction and distance;
   re-capturing the subject after the subject has moved out of the subject area;
   storing a second image including the re-captured subject after the subject has moved out of the subject area;
   detecting a local image area corresponding to the subject area of the first image from the stored second image; and
   synthesizing, by way of a processor of the display apparatus, the detected local image area with the stored first image to generate a background image from which the subject has been removed.

2. The method of claim 1, further comprising:
   capturing the subject to acquire a third image; and
   comparing the generated background image with the third image to separate a subject image from the third image and to display the subject image separated from the third image.

3. The method of claim 2, wherein the displaying of the subject image comprises synthesizing the subject image separated from the third image with a pre-stored background image to display the synthesized image comprising the subject image separated from the third image synthesized with the pre-stored background image.

4. The method of claim 2, wherein the detecting of the subject area comprises:
   detecting a user face part in the first image; and
   detecting a local area comprising the user face part as the subject area.

5. The method of claim 2, wherein the detecting of the subject area comprises:
   capturing the subject sequentially a plurality of times to store a plurality of first images; and
   comparing the plurality of first images to detect an area, from which a motion is sensed, as the subject area.

6. The method of claim 2, further comprising:
   dividing the subject area into a plurality of sub areas; and
   dividing the local image area of the second image into a plurality of sub local image areas respectively corresponding to the plurality of sub areas,
   wherein the local image area is synthesized with the first image in units of at least one sub local image areas.

7. The method of claim 1, wherein the guide message is a graphical user interface (GUI) message displayed on a display unit displaying the first image to indicate the direction and the distance to which the subject is to move.

8. The method of claim 1, wherein the guide message is a voice message that guides a direction and distance to which the subject is to move.

9. The method of claim 1, wherein the subject area is detected by using a face tracking algorithm or by capturing a subject sequentially a plurality of times.

10. A computer program processed by a processor and stored on a non-transitory computer-readable to execute the method of claim 1.

11. A display apparatus for generating a background image comprising:
    a storage to store a captured first image of a subject;
    an output unit to output a guide message for guiding the subject to move out of a subject area of the first image; and
    a processor configured to, acquire a re-captured second image of the subject after the subject has moved out of the subject area, detect a local image area corresponding to the subject area of the first image from the second image, and synthesize, by way of a processor of the display apparatus, the detected local image area with the first image to generate a background image from which the subject has been removed and to store the background image in the storage,
    wherein the processor calculates a direction and distance in which the subject moves in order to get out of the subject area,
    wherein the guide message is a message for guiding a direction and a distance to which the subject is to move according to the calculated direction and distance.

12. The display apparatus of claim 11, wherein the output unit comprises a display unit,
    wherein the processor controls the display unit to capture the subject so as to acquire a third image, compare the background image with the third image, separate a subject image from the third image, and display the subject image separated from the third image.

13. The display apparatus of claim 12, wherein the processor controls the display unit to synthesize the subject image separated from the third image with a pre-stored background image and display the synthesized image comprising the subject image separated from the third image synthesized with the pre-stored background image.

14. The display apparatus of claim 12, wherein the processor detects a user face part in the first image and detects a local area comprising the user face part as a subject area.

15. The display apparatus of claim 12, wherein the storage unit captures the subject sequentially a plurality of times to store a plurality of first images,
    wherein the processor compares the plurality of first images to detect an area, from which a motion is sensed, as a subject area.

16. The display apparatus of claim 12, wherein the processor detects a subject area comprising the subject in the first image, divides the subject area into a plurality of sub areas, divides the local image area detected from the second image into a plurality of local image areas respectively corresponding to the plurality of sub areas, and synthesizes at least one sub local image areas with the first image.

17. The display apparatus of claim 11, wherein the guide message is a GUI message displayed on the display unit displaying the first image to indicate a direction and a distance to which the subject is to move.

18. The display apparatus of claim 11, wherein the guide message is a voice message for guiding the direction and the distance to which the subject is to move.

19. An image capturing method comprising:
    capturing a first image of a subject, using a camera, and detecting a subject area including the subject within the captured first image;
    calculating a direction and distance in which the subject moves in order to get out of the subject area,
    transmitting a signal from the camera to a mobile device, the signal including a command causing the mobile device to output a guide message to guide the subject to move out of the subject area of the first image according to the calculated direction and distance while staying within an area of the captured first image; and
    capturing a second image of the subject, using the camera, after the subject has moved out of the subject area in accordance with the guide message.

20. The image capturing method of claim 19, wherein the guide message comprises at least one of a GUI message, displayed on a display screen of the mobile device, that indicates the direction and the distance in which the subject is to move, and a voice message, output through a speaker unit of the mobile device, that indicates the direction and the distance in which the subject is to move.

* * * * *